Sept. 12, 1939.     H. M. EVJEN     2,172,557
ELECTRICAL METHOD OF GEOPHYSICAL EXPLORATION
Filed March 30, 1937     2 Sheets-Sheet 1

Inventor: HAAKON MUUS EVJEN

Sept. 12, 1939. H. M. EVJEN 2,172,557
ELECTRICAL METHOD OF GEOPHYSICAL EXPLORATION
Filed March 30, 1937 2 Sheets-Sheet 2

Inventor: HAAKON MUUS EVJEN

Patented Sept. 12, 1939

2,172,557

UNITED STATES PATENT OFFICE 2,172,557

ELECTRICAL METHOD OF GEOPHYSICAL EXPLORATION

Haakon Muus Evjen, Houston, Tex., assignor to Shell Development Company, San Francisco, Calif., a corporation of Delaware Application March 30, 1937, Serial No. 133,804

9 Claims. (Cl. 175—182)

This invention pertains to electrical methods for determining the presence of valuable minerals, oils and other subterraneous deposits, and relates more specifically to a method for controlling and regulating the distribution and density of an electric current passed through the ground by means of three or more current electrodes.

According to the present invention, the current in the ground is controlled by placing at the surface of the ground a plurality of current electrodes, which may be termed as current sources or sinks, according to whether the current is entering or leaving the ground therethrough, and controlling the relative strengths of these sources and sinks. The strength of a source or sink is proportional to the current entering or leaving the ground therethrough.

There have been developed in the art of geophysical exploration many methods whereby a current sent into the ground and taken out therefrom by means of electrodes, known as current electrodes, is used to generate a potential difference between other electrodes, known as potential electrodes. A study of the magnitude and characteristics of this potential difference, observed and recorded by means of suitable apparatus, gives valuable indications as to the nature and peculiarities of the ground under exploration.

Electrical methods of geophysical exploration are, however, subject to numerous drawbacks, which are especially apparent in systems involving the use of two current and two potential electrodes.

First, if only two current electrodes are used in contact with the ground, there is always only one source and one sink of equal strength, and the distribution of the current in the ground depends only on the electrical properties of the ground. The current will distribute itself according to a certain pattern determined by these properties, and the operator will have no control over this distribution.

The lack of sharpness usually observed in apparent resistivity graphs obtained by known electrical methods is chiefly due to the fact that the observed effects are the result of an integration from the surface of the earth to its center. Any kind of resolution of effects which it is at all possible to obtain is due to the fact that during the process of integration more is contributed by certain formation layers than by others. The observed apparent resistivity may be considered as a weighted average of the resistivities of the strata overlying each other, more relative weight being given to a certain layer than to others.

Second, all electrodes possess comparatively large and variable contact resistances which must be eliminated from the measurements. Particularly, if potential electrodes are used, it is important that they should draw no current. Even very small currents produce at the electrodes a polarization effect which persists long after the current has been interrupted, and tends to destroy the accuracy of the measurements. By any potential measurement, however, some current is unavoidably drawn from the potential leads. Even the most efficient vacuum tube grid voltmeter draws some current, and by null measurements involving the use of a bridge, some current is drawn before a balance is established. Due to the fact that electrode resistances may become extremely great at very small currents, the sensitivity of any method employing potential electrodes is probably definitely limited. Moreover, contact potentials exist at the interface between potential electrodes and ground, which potentials, due to ground unrest and other reasons, may vary considerably with time. These variable contact potentials interfere seriously with the accuracy of the measurements.

Third, the accuracy of electric measurements is definitely limited by the "background noise", which term comprises atmosphere and ground disturbances of an electric nature. In the case of low-frequency measurements, the main source of disturbances is the 60-cycle alternating current from power lines always present in the ground. The amount of stray alternating current picked up is roughly proportional to the span between the electrodes across which the galvanometer or any other measuring device is placed.

It is the object of this invention to eliminate or minimize these drawbacks by providing a method of electrical exploration whereby the current distribution in the ground may be adjusted and regulated in any desired manner through the use of a plurality of current electrodes. By this method, the current density in a certain reference plane may be given a maximum value by a proper manipulation of the three variable parameters at the disposal of the operator, spacing of electrodes, frequency, and current intensity in the several branches. By "focussing" in succession the electric current to various depths, the characteristic properties of the ground at various depths can be successively explored and analyzed.

It is another object of this invention to provide a method for segregating and completely separating from each other the portions of the electric current which have penetrated to different depths. In other words, the various structures lying at different depths in the ground are placed in parallel, and the currents through the various branches are measured separately. By the ordinary two-electrode systems, the materials at the different depths are also placed in parallel, but only the total current is measured. Obviously, if the materials in one of the layers forming said parallel branches should exhibit characteristic electric properties, the latter can be detected only with great difficulty by a measurement of the total current, whereas these characteristic properties may have a relatively large effect on the particular portion of current passing through said layer.

It is a further object of this invention to provide a method of electrical exploration involving the use of a plurality of current electrodes and eliminating the use of potential electrodes and the difficulties attendant thereto.

The nature of the present invention in its various embodiments will appear more clearly from the following description, taken in connection with the attached drawings, wherein.

Figure 1:
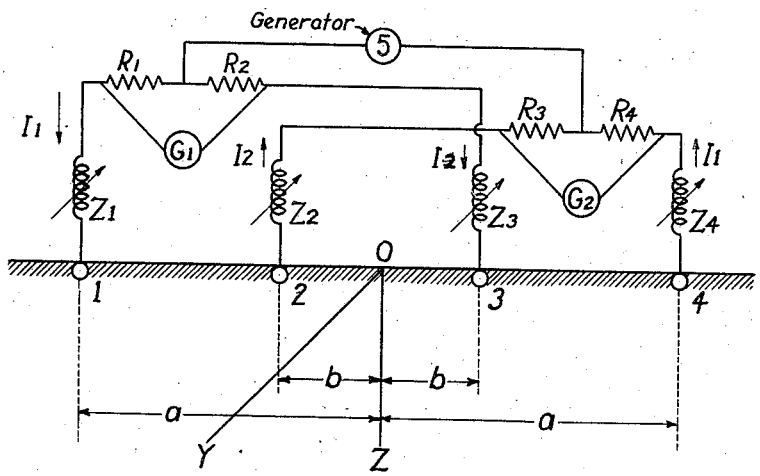
Fig. 1 illustrates diagrammatically the principle according to which the current density in the ground may be given a maximum value at a preassigned depth.

The manner in which the current density may be given a maximum value at any preassigned depth is diagrammatically illustrated in Fig. 1, which shows a generator 5, or any other source of direct or alternating electric current, having electrodes 1 and 3 connected to one of its terminals, and electrodes 2 and 4 connected to the other terminal. $Z_1$, $Z_2$, $Z_3$ and $Z_4$ are impedances connected in each of the electrode branches of the circuit, by means of which the current intensity in each branch may be suitably regulated. Galvanometers $G_1$ and $G_2$, connected respectively across resistances $R_1$ and $R_2$, and $R_3$ and $R_4$, are used to indicate the current intensities in each electrode branch. Assuming, for the sake of simplicity a symmetrical arrangement of electrodes with regard to the point of origin O of a system of coordinates $x$, $y$ and $z$, in such a manner that the distance along the $x$-axis of electrode 1, or of electrode 4, from point O equals $a$, and the distance along the $x$-axis of electrode 2, or of electrode 3, from point O equals $b$, the impedances $Z_1$, $Z_2$, $Z_3$ and $Z_4$ are adjusted so that the current $I_1$, sent into the ground through electrode 1 equals the current $I_1$, taken from the ground through the electrode 4, while current $I_2$, sent into the ground through electrode 3 equals the current $I_2$ taken from the ground through electrode 2.

If the ground is uniform, it may be shown that under these conditions the current density $i$ at a depth $z$ on the $z$-axis is expressed by the equation $$i = (1/\pi)\left(\frac{aI_1}{(z^2+a^2)^{\frac{3}{2}}} - \frac{bI_2}{(z^2+b^2)^{\frac{3}{2}}}\right)$$

and that the maximum current density occurs at a depth $z_m$ such that $$z_m^2 = \left(\frac{a^2(I_2 b)^{\frac{2}{3}} - b^2(I_1 a)^{\frac{2}{3}}}{(I_1 a)^{\frac{2}{3}} - (I_2 b)^{\frac{2}{3}}}\right)$$

By varying, therefore, the current ratio $I_1/I_2$, the depth of maximum current density may be varied from zero to infinity, that is, it may be made to pass through any preassigned depth.

Although, as stated above, these equations have been developed, for the sake of simplicity, for a symmetrical four-electrode arrangement in a homogeneous ground formation, the principle derived is obviously applicable to any multi-current-electrode system in any formation, and similar equations, necessarily of a somewhat more complex character, can be derived in such cases to show that the depth of maximum current density is a function of the ratio of the currents flowing through current electrodes.

Figure 2:
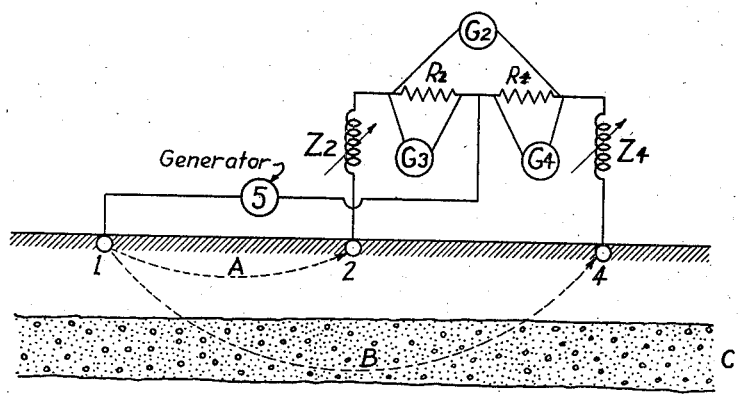
Fig. 2 is a diagram of a three electrode system of electrical exploration according to the present invention.

Referring to Figure 2, the system of the present invention broadly comprises a source of electric current shown at 5, which may be a battery, a D. C. or A. C. generator, an oscillator or any other device adapted to generate a continuous or interrupted direct current, an alternating current, or a high-frequency alternating current.

One of the terminals of said source of current is connected to an electrode 1, and the other terminal to two or more electrodes, of which only electrodes 2 and 4 are shown in Figure 2 by way of illustration. The electrodes are suitably spaced from each other and are in good contact with the ground, precautions being taken to prevent polarization. The two circuit branches leading to the electrodes 2 and 4 are provided respectively with adjustable variable impedances $Z_2$ and $Z_4$, by means of which the intensity of the currents flowing in each branch may be controlled, and fixed resistances $R_2$ and $R_4$, the latter being preferably equal to each other. A sensitive device, such as a galvanometer, a vacuum tube grid voltmeter, a recording galvanometer, or an oscillograph such as $G_2$, is connected across the two fixed resistances $R_2$ and $R_4$. A similar registering or recording device such as $G_3$ and $G_4$ may also be connected, if desired, across each of the resistances $R_2$ and $R_4$.

Owing to this arrangement, the current in the ground will flow from (or to) the electrode 1, partly to (or from) electrode 2, and partly to (or from) electrode 4.

Since it is well known from electrical theory that current lines do not cross, the current stream from electrode 1 to electrode 4, schematically indicated by the dotted line B, will form an envelope around the current stream from electrode 1 to electrode 2, indicated by the dotted line A, and will, on the whole, penetrate much deeper than the latter into the ground. A separation of current streams of deeper and shallower penetration is thereby effectively achieved. The depth of penetration may be defined as the depth at which the portion of the total current not reaching said depth is equal to the portion of the total current penetrating below said depth. It may be noted that if the ratio of the currents is kept the same, and if all electrode spacings are increased in the same proportion, then for sufficiently low frequencies the depth of penetration of the current into the ground will be proportional to the distance between the electrodes provided the ground is uniform and homogeneous.

The intensity of current in each branch of the circuit may be controlled and adjusted as desired by means of the variable impedances $Z_2$ and/or $Z_4$. For example, these currents may be made equal to each other by adjusting impedances $Z_2$ and $Z_4$ until a zero reading is obtained on the sensitive galvanometer $G_2$. The measurements are then repeated while varying one or more of the following parameters: (1) frequency of the current; (2) intensity of the total current; (3) spacing of the electrodes. The amount by which the variable impedances $Z_2$ and $Z_4$ are adjusted to keep the currents in the two circuit branches equal is recorded after each measurement. By varying the spacing of the electrodes, and suitably adjusting the current flowing through each of them, the distribution of the current streams and their intensity in the various underground strata can be very effectively controlled.

The particular electrical properties of the various strata through which the current streams pass underground can be determined by means of recording devices suitably connected in the circuit. For example, oscillographs $G_3$ and $G_4$ may be connected respectively across the resistances $R_2$ and $R_4$ in the circuit branches of the electrodes 2 and 4. If the current stream B from electrode 1 to electrode 4 passes through a formation layer C, having particular electrical properties, while the current stream from electrode 1 to electrode 2 does not pass through said layer, the oscillograms obtained by means of oscillograph $G_4$ will show some characteristic features different from those of the oscillogram obtained by means of oscillograph $G_3$. Oscillograms of transients obtained in this manner by suddenly breaking and making the circuit are especially useful for exploration purposes.

Figure 4:
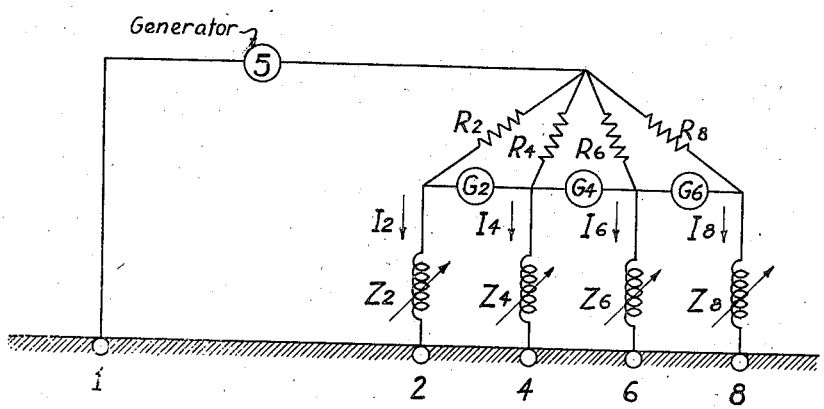
Fig. 4 is a diagram showing connections used when more than two electrodes are connected to either of the terminals of the source of electric current.

If it is desired to connect more than two current electrodes to either of the terminals of the current source, an arrangemnt such as shown in Fig. 4 may be used. The same symbols as in Fig. 2 being used to denote galvanometers, fixed resistances and variable impedances, Fig. 4 shows electrode 1 connected to one of the terminals of generator 5, and electrodes 2, 4, 6 and 8 connected to its other terminal. In such case, if the galvanometer readings are all zero, the following relationship is obtained:

$$R_2 I_2 = R_4 I_4 = R_6 I_6 = R_8 I_8$$

whereby the current ratios are fixed.

Figure 3:
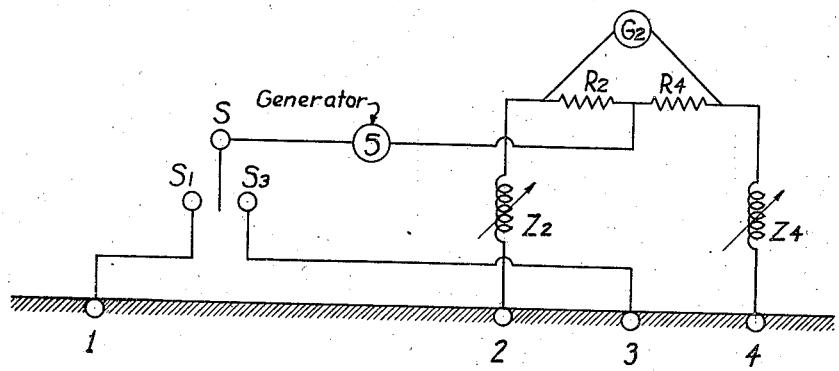
Fig. 3 is a diagram of a preferred arrangement of apparatus for practicing the present invention.

A preferred method of practicing the present invention is diagrammatically illustrated in Fig. 3. The arrangement of apparatus shown in Fig. 3 is similar to that of Fig. 2, a double-throw switch S being, however, interposed between the electrode 1 and the generator 5. By changing the position of this switch, the total current from the generator may be caused to flow through the electrode 3 instead of the electrode 1.

In operation the following procedure may be followed:

The double-throw switch S is first thrown into a position $S_1$, so that the electric circuit comprises electrodes 1, 2 and 4. In other words, the current in the ground will flow from (or to) the electrode 1, partly to (or from) the electrode 2 and partly to (or from) the electrode 4.

The impedances $Z_2$ and/or $Z_4$ are now adjusted so that the currents flowing respectively through the branches of the electrodes 2 and 4 are equal, that is, so that a balance is obtained on the sensitive galvanometer $G_2$.

If, now, the double-throw switch is thrown to the position $S_3$, so that the total current flows through the electrode 3 instead of the electrode 1, it will be found that the currents flowing in the two branches 2 and 4 of the circuit are no longer equal. In order to equalize the two currents and to restore the balance, the variable impedance $Z_2$, or the variable impedance $Z_4$, or both, are adjusted by an amount which is recorded.

The same measurements may be repeated for different current intensities, and frequencies (either direct, alternating, or high frequency alternating current being used) and for different electrode spacing, the adjustments of the impedances $Z_2$ and $Z_4$ being recorded after each measurement. As an example the space between electrodes 2 and 4 may be varied. Likewise, the electrodes 2, 3 and 4 may be left stationary and the electrode 1 moved to various distances. The electrode 3 serves as a point of reference and may be placed half-way between the electrodes 2 and 4 or at any other convenient point.

The interpretation of the results obtained is effected in a manner familiar to those versed in electro-magnetic theory as commonly applied to geophysical exploration. It may be stated, however, that if the electrode 3 is placed half-way between the electrodes 2 and 4, and the electrical properties of the ground change only in a vertical direction, the change in the impedances $Z_2$ and $Z_4$ required to equalize the currents flowing respectively through electrodes 2 and 4 after a change in the position of switch S is equal to the potential difference which would exist between two potential electrodes placed at points 2 and 4, if unit current were sent into the ground at the electrode 1 and taken out at a distance sufficiently remote to be considered infinite for practical purposes.

It will be noted that this result is attained in spite of the fact that no potential electrodes are used in the present system, measurements of ratios of currents flowing in the several current electrode branches being substituted for direct measurements of potential between such potential electrodes. Moreover, in view of the relatively short span between electrodes 2 and 4, the amount of atmospheric and ground disturbances picked up during the measurements is kept at a minimum.

It also may be mentioned that the measurements here described are essentially so-called "bridge measurements", the unsurpassed accuracy of which is generally recognized.

It is understood that the above description of a three-electrode method of geophysical exploration is given only by way of illustration, since the method of the present invention may be practiced with any desired number of current electrodes greater than three, and is, moreover, capable of various changes and alternative arrangements coming within the scope of the appended claims. It is particularly to be noted that a straight line arrangement of electrodes has been described above and illustrated in the drawings only for the sake of clearness. When changes of electrical properties of the ground in the horizontal direction are investigated, as exemplified, for instance, by faults and dips, it is desirable not to be limited to straight line work, and any other suitable arrangement of electrodes may be advantageously used.

As an example, the following test run according to the method of the present invention may be described.

The arrangement of apparatus shown in Fig. 3 was used. The spacing between electrode 3 and electrodes 2 and 4 was kept constant at 10 meters. The distance between electrode 1 and electrode 3 was varied in steps of 10 meters from 20 to 70 meters during the run. An oscillator having a current generating capacity of 0.03 ampere for the terminal impedances used was connected at 5, and its frequency varied from 11 to 36 cycles per second. The voltage impressed on the ground was of the order of 1 volt. The sensitivity of the voltmeter $G_2$ was about 0.00003 volt. The smallest apparent resistance which could be measured with the apparatus was, therefore, about 0.001 ohm.

From the set of observations obtained the apparent resistivity of the ground was calculated as a function of the distance between the electrodes 1 and 3 and of the frequency. The value of this apparent resistivity was found to have a minimum in the neighborhood of 30 cycles per second. The data obtained clearly indicated the presence of a high resistivity layer at a depth of about 15 meters, which was later proved to be correct.

It must be particularly pointed out that in commercial applications, much greater depths than those dealt with in the above test have to be investigated. The currents, voltages, sensitivities of indicating devices and electrode spacings used have, therefore, to be increased by factors varying from ten to over a hundred, which can be achieved by means of readily available apparatus of greater sensitivity and power. Since it is now possible to measure accurately apparent resistances of the order of $10^{-5}$ ohms, electrode spacings of several miles can be used according to the present invention, which permits an investigation of depths of the order of one mile.

It may also be pointed out that in investigating the ground at considerable depths, the present method should preferably be used with very low frequencies, such as frequencies of 1 cycle per second, or even less, in order to reduce the so-called skin effect.

I claim as my invention:

1. In a method of geophysical exploration by means of a circuit comprising a source of electric current having one terminal connected to the ground at at least one point and the other terminal connected to the ground at a plurality of points through a plurality of variable impedances, the steps of passing an electric current through the ground between said first and said second named points in a plurality of non-crossing streams having different depths of penetration, adjusting the intensity of each stream by means of the variable impedances to a desired relative value different from that of the other streams, and determining the electrical properties of the ground at various depths by indicating the characteristics of the current in each of said streams.

2. In a method of geophysical exploration by means of a circuit comprising a source of electric current having one terminal connected to the ground at one point, and the other terminal connected to the ground at a plurality of points through a plurality of variable impedances, the steps of passing an alternating current through the ground between the said one point and the said plurality of points, causing the current to flow through the ground in a plurality of non-crossing streams having different depths of penetration, equalizing the current in each stream by means of the variable impedances varying the frequency of the current, and determining the electrical properties of the ground at various depths by recording the change in the current intensity of each stream when the frequency of the current is varied.

3. In a method of geophysical exploration by means of a circuit comprising a source of electric current having one terminal connected to the ground at one point, and the other terminal connected to the ground at a plurality of points through a plurality of variable impedances, the steps of forcing an electric current into the ground at the said one point and withdrawing it from the ground at the said plurality of points, causing the current to flow through the ground in a plurality of non-crossing streams having different depths of penetration, equalizing the current in each stream by means of the variable impedances, varying the location of the first point with regard to the other points, again equalizing the current in each stream by adjusting the variable impedances, and determining the electrical properties of the ground at various depths from the amount of impedance adjustment necessary to equalize the stream currents after the location of the first point has been changed.

4. In a method of geophysical exploration by means of a circuit comprising a source of electric current having one terminal connected to the ground at one point, and the other terminal connected to the ground at a plurality of points through a plurality of variable impedances, the steps of passing an electric current through the ground between the said one point and the said plurality of points, causing the current to flow through the ground in a plurality of non-crossing streams having different depths of penetration, adjusting the current intensities of said streams to a desired ratio by means of the variable impedances, changing the location of the first point with regard to the other points, readjusting the current intensities of the streams to the same ratio, and determining the electrical properties of the ground at various depths from the amount of impedance adjustment necessary to readjust the stream currents to said desired ratio after the location of the first point has been changed.

5. In a method of geophysical exploration by means of a circuit comprising a source of electric current having one terminal connected to the ground at one point, and the other terminal connected to the ground at a plurality of points through a plurality of variable impedances, the steps of passing an alternating current through the ground between the said one point and the said plurality of points, causing the current to flow through the ground in a plurality of non-crossing streams having different depths of penetration, adjusting the current intensities of said streams to a desired ratio by means of the variable impedances, changing the frequency of the alternating current, readjusting the current intensities of the streams to the same ratio, and determining the electrical properties of the ground from the amount of impedance adjustment necessary to readjust the stream currents to said desired ratio after the frequency of the current has been changed.

6. In a method of geophysical exploration by means of a circuit comprising a source of electric current having one terminal connected to the ground at one point, and the other terminal connected to the ground at a plurality of points through a plurality of variable impedances, the steps of passing an electric current through the ground between the said one point and the said plurality of points, causing the current to flow through the ground in a plurality of non-crossing streams having different depths of penetration, adjusting the current intensity of each stream to a desired ratio by means of the variable impedances, changing the location of the first point with regard to the other points, and determining the electrical properties of the ground at various depths by registering the change in the ratio of the stream current intensities when the location of the first point with regard to the other points is varied.

7. In a method of geophysical exploration by means of a circuit comprising a source of electric current having one terminal connected to a grounded electrode and the other terminal connected to a plurality of grounded electrodes through a plurality of variable impedances, each of said last electrodes being at a different distance from said first electrode, the steps of passing an electric current through the ground between said first electrode and said last electrodes, adjusting the current passing through each of said last electrodes to a value different from that of the others, whereby the current is caused to flow through the ground in a plurality of non-crossing streams having different intensities and different depths of penetration, and determining the electrical properties of the ground at various depths by indicating the characteristics of the current in each of said streams.

8. In a method of geophysical exploration by means of a circuit comprising a source of electric current having one terminal connected to the ground at one point and the other terminal to the ground at a plurality of points through a plurality of variable impedances, the steps of passing an electric current through the ground between said first and said second named points in a plurality of non-crossing streams having different depths of penetration, adjusting the intensity of each stream by means of the variable impedances to a desired relative value different from that of the other streams, interrupting the current flowing in the circuit, and determining the electrical properties of the ground at various depths by recording the transient phenomena occurring in the various streams at each interruption.

9. In a method of geophysical exploration, the steps of passing through the ground a plurality of current streams from a single electric source, causing said streams to penetrate the ground to different depths by adjusting the intensities of said streams to different relative values, and observing the characteristics of the current in each stream.

HAAKON MUUS EVJEN.